United States Patent
Felton (10) Patent No.: US 7,903,683 B1
(45) Date of Patent: Mar. 8, 2011

(54) FAULT TOLERANT DIPLEX COMMUNICATIONS

(75) Inventor: Mickey S. Felton, Sterling, MA (US)

(73) Assignee: EMC Corporation, Hopkinton, MA (US)

( * ) Notice: Subject to any disclaimer, the term of this patent is extended or adjusted under 35 U.S.C. 154(b) by 145 days.

(21) Appl. No.: 11/862,589

(22) Filed: Sep. 27, 2007

(51) Int. Cl.
*H04L 12/66* (2006.01)
*H04L 1/00* (2006.01)

(52) U.S. Cl. .................... 370/463; 370/242

(58) Field of Classification Search ........ 370/463, 370/480, 200, 248, 297, 275, 281, 295, 302, 370/522, 527, 488, 493, 494, 195, 497, 529, 370/242; 375/257, 497; 381/1; 395/183.19, 395/183

See application file for complete search history.

(56) References Cited

U.S. PATENT DOCUMENTS

| | | | | |
|---|---|---|---|---|
| 5,901,151 A * | 5/1999 | Bleiweiss et al. | ........... | 370/480 |
| 6,509,994 B2 | 1/2003 | West, Jr. | | |
| 7,487,285 B2 | 2/2009 | Holland et al. | | |
| 7,523,236 B1 | 4/2009 | Nemazie et al. | | |
| 7,536,484 B1 | 5/2009 | Felton | | |
| 7,539,797 B2 | 5/2009 | Nemazie et al. | | |
| 2008/0304509 A1 | 12/2008 | Xu et al. | | |
| 2009/0300562 A1 | 12/2009 | Xu et al. | | |

OTHER PUBLICATIONS

Serial Attached SCSI Rev01, Information Technology—Serial Attached SCSI—2 (SAS—2), Nov. 13, 2005, all pages.*
Notice of Allowance for U.S. Appl. No. 11/862,582 dated Feb. 3, 2010 (10 pages).
Notice of Allowance for U.S. Appl. No. 11/862,582 dated May 17, 2010 (10 pages).
"Working Draft Serial Attached SCS1-1.1 (SAS-1_1)", Working Draft Revision 9e, Jul. 24, 2005 and published by T10, a technical subcommittee of the Int'l Committee for Information Technology Standards; Sec. 6.6, pp. 172-178.

* cited by examiner

*Primary Examiner* — Kwang B Yao
*Assistant Examiner* — Adam Duda
(74) *Attorney, Agent, or Firm* — Guerin & Rodriguez LLP; Mary M. Steubing

(57) ABSTRACT

Diplexing is employed in systems having multiple differential conductor pairs. A first differential coupling differentially couples a first signal onto a first pair of conductors; a second differential coupling which differentially couples a second signal onto a second pair of conductors; a first common mode coupling selectably common mode couples a third signal onto the first pair of conductors; a second common mode coupling selectably common mode couples a fourth signal onto the second pair of conductors; and a switch is operational to select the first common mode coupling or the second common mode coupling based upon a triggering event.

10 Claims, 9 Drawing Sheets

Fig. 1

PRIOR ART

FAULT TOLERANT DIPLEX COMMUNICATIONS

FIELD OF THE INVENTION

The invention relates to data storage systems, and particularly to mechanisms for communicating between disk arrays via communications links.

CROSS REFERENCE TO RELATED APPLICATIONS

This application is related to co-pending and commonly assigned Utility Patent Application "SAS Diplex Communications" by Mickey S. Felton filed on the same day herewith.

BACKGROUND OF THE INVENTION

Data storage systems employ many different methods of internal communications for environmental management purposes. Often employed is a microprocessor and a two-wire asynchronous communications bus such as RS-232 or I2C within each array of the data storage system in order to monitor for faults, monitor environmental edge conditions, control upgrades, etc. It is desirable to be able to extend such communications buses between the arrays of the system in an efficient and fault tolerant manner.

SUMMARY OF THE INVENTION

In accordance with the invention, a relatively low frequency signal is coupled to and then extracted from a communication link that carries both a high frequency continuous signal and burst mode signal having bursts occurring at one or more frequencies. Such a communication link has a differential coupling which differentially couples onto a first pair of conductors a continuous signal at a continuous rate and a burst mode signal having bursts occurring at one or more frequencies. The communication link also has a common mode coupling which common mode couples a second signal onto the first pair of conductors. A high pass filter coupled to the first pair of conductors extracts the continuous signal and the burst mode signal from the first pair of conductors. A low pass filter coupled to the first pair of conductors extracts the second signal from the first pair of conductors. The invention is advantageously applied in data storage systems wherein the communication link is a SAS 8B/10B encoded signal and the burst mode signal is a SAS OOB signal, and the low frequency signal is an RS-232 signal.

According to another aspect of the invention, a fault tolerant form of diplexing is employed in systems having multiple differential conductor pairs. Apparatus includes a first differential coupling which differentially couples a first signal onto a first pair of conductors; a second differential coupling which differentially couples a second signal onto a second pair of conductors; a first common mode coupling which selectably common mode couples a third signal onto the first pair of conductors; a second common mode coupling which selectably common mode couples a fourth signal onto the second pair of conductors; and a switch operational to select the first common mode coupling or the second common mode coupling based upon a triggering event. The triggering event is a fault or a manual or automatic switchover or an upgrade. The apparatus is particularly useful in data storage systems where the first and second signals are SAS 8B/10B encoded signals and SAS OOB signals, and wherein the third and fourth signals comprise RS-232 signals.

DETAILED DESCRIPTION OF EXEMPLARY EMBODIMENTS

Figure 1:
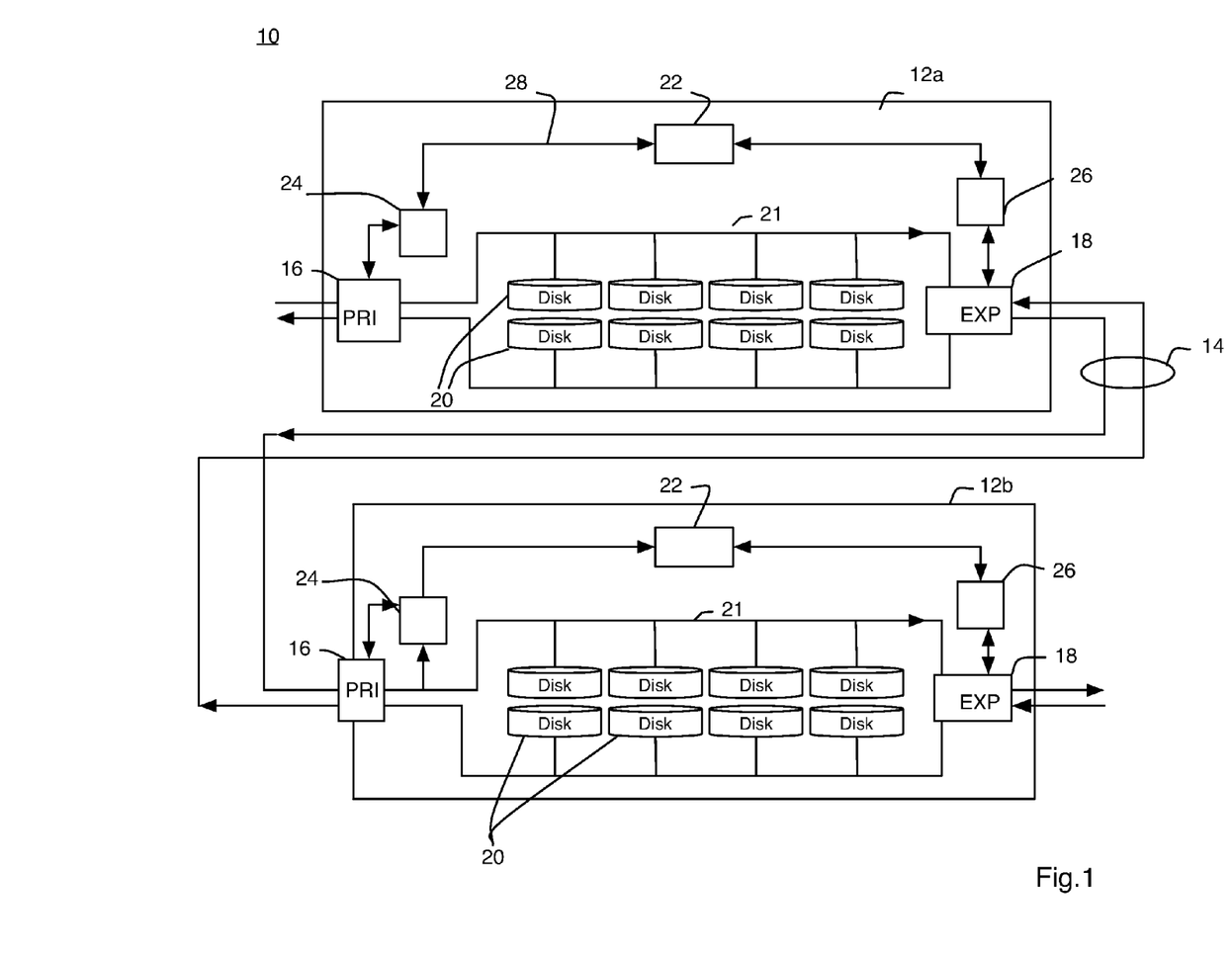
FIG. 1 is a schematic diagram of a data storage system in which the invention can be employed.

In FIG. 1 there is shown a generalized data storage system 10 of the types available from EMC Corporation of Hopkinton, Mass. in which the invention can be employed. The storage system 10 includes disk arrays 12 (12a,b) coupled to each other via high speed serial communications link 14. Each disk array 12 has a primary port 16 and an expansion port 18. The disk arrays 12 are linked by connecting the expansion port 18 of one array, e.g. array 12a, to the primary port of the next array, e.g. array 12b, the via the high speed serial communications link 14.

Within each disk array 12 an array of disk drives 20 is coupled to the high speed serial communications link 14 in the manner known for the type of link in use—i.e. Fibre Channel, SAS, SATA. etc. In the embodiment shown here, the disk drives 20 are coupled via a SAS loop 21. Each array 12 implements an environmental monitor 22, which may be for example an RS232 controller coupled to a microprocessor for running system management software. First diplex logic 24 is coupled between the high speed serial communications link 14 primary port 16 and the environmental monitor 22. Second diplex logic 26 is coupled between the environmental monitor 22 and the serial communications link expansion port 18. A low speed serial bus 28 is coupled between the primary port 16, diplex logic 24, environmental monitor 22, diplex logic 26, and expansion port 18.

Between arrays 12a, 12b, "diplexing" is used to provide the path for the low speed serial communication bus 28 and the signals for the high speed disk drive loop over the same transmission wires 14 connecting the arrays 12 to one another. Diplexing low frequency serial signals and high frequency I/O signals is described in U.S. Pat. No. 5,901,151 (the "'151 patent"), commonly owned by the assignee of the present invention, which patent is hereby incorporated by reference in its entirety.

In the '151 patent, low frequency signals such as RS-232 signals are diplexed with high frequency signals such as Fibre Channel signals. The Fibre Channel signals are 8B/10B encoded and are continuously switching. The 8B/10B signal encoding of the continuous Fibre Channel signal advantageously guarantees frequent transitions on the signal lines so that the frequency content of the Fibre Channel signal is isolated to 100 MhZ and above.

Figure 2:
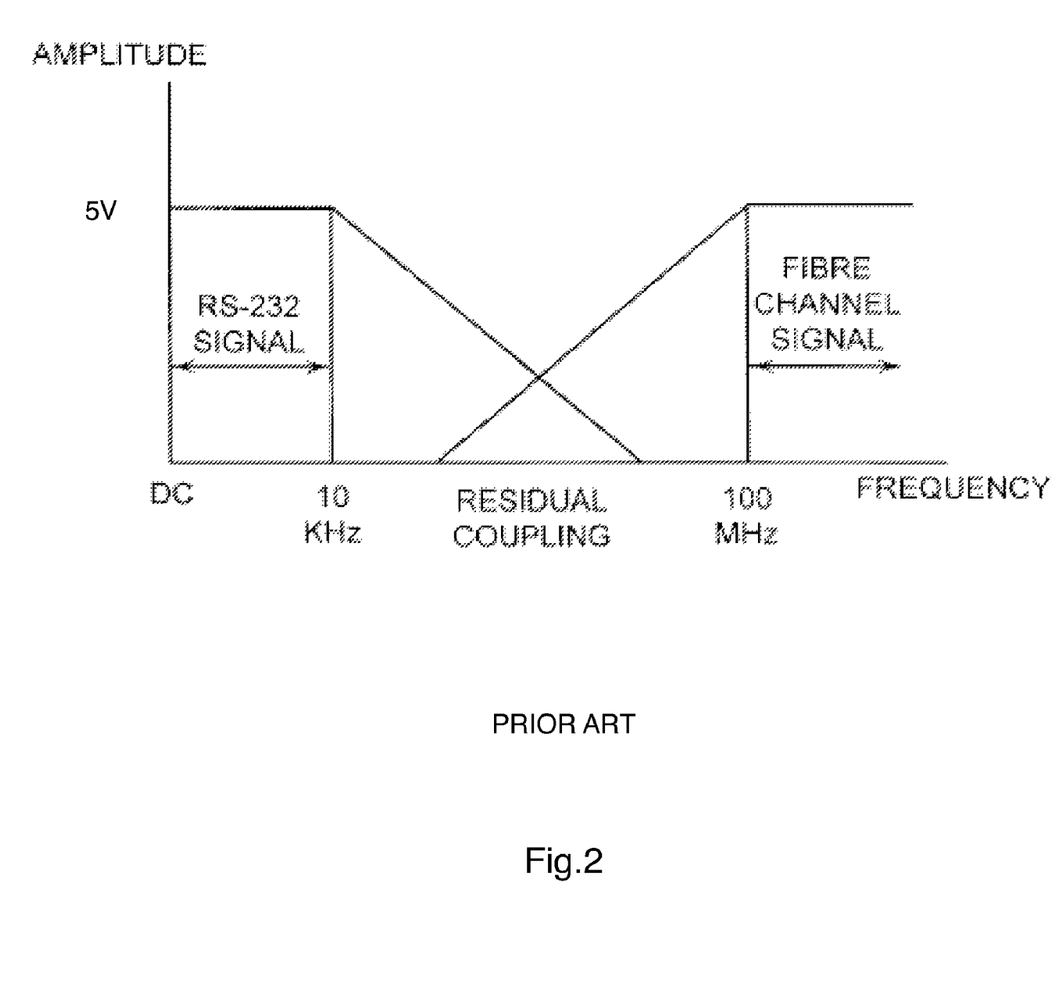
FIG. 2 is a frequency response a prior art diplex filter in a Fibre Channel system.

Referring to FIG. 2, there is shown an approximation of the frequency response of the diplex and Fibre Channel circuit, as was shown in FIG. 5 of the '151 patent. The Fibre Channel signal is isolated to the 100 Mhz and above range by the nature of the 8B-10B encoding. The common mode asynchronous diplex signal, operating at 9600 baud, operates below 10 Khz. The frequency responses have small enough overlap such that the diplex signal can be run at a relatively high (3.3-5V) voltage level, in the same ranges as the high frequency Fibre Channel signals, while being safely rejected by the differential high pass Fibre Channel receivers, and easily recovered by the common mode low pass diplex receivers.

SAS (Serial Attached SCSI) is similar to Fibre Channel in that it is a high speed differential 8B-10B encoded serial protocol. But in addition, SAS implements a burst mode management channel protocol referred to as "OOB". SAS is fully described in "Project T10/1760-D, Serial Attached SCSI-2", herein incorporated by reference. SAS OOB operates by sending bursts of ALIGN characters followed by gaps of DC Idle. The DC Idle gaps distinguish OOB signals from each other. A squelch circuit within each SAS differential receiver detects and differentiates OOB signals by 1) detecting burst activity on the line, in particular by identifying 0 voltage crossings, and 2) measuring the gap between bursts. (SAS-2 6.6.2) In accordance with the invention, it has been discovered that modifications to diplexing need to be made in order to accommodate the burst mode OOB signal.

Figure 3:
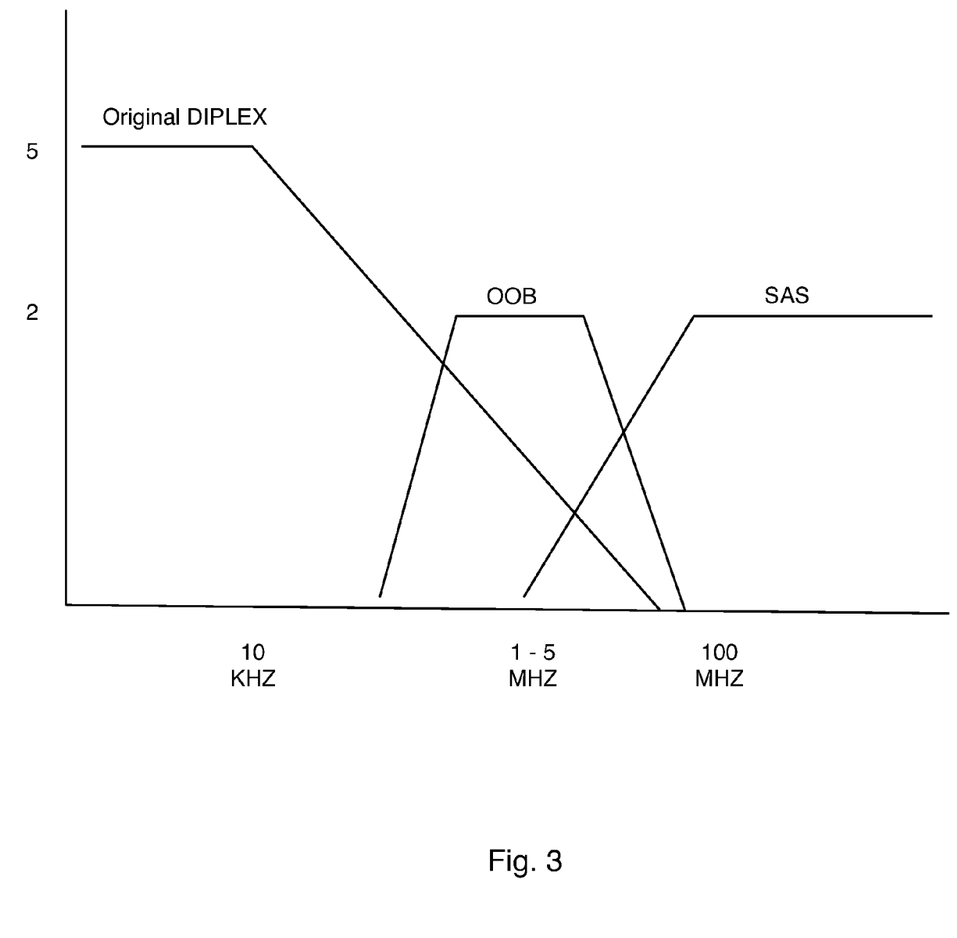
FIG. 3 is a frequency response approximation of how a prior art diplex filter would appear in a current SAS system.

In FIG. 3, there is shown an approximation of the bandwidth profile of a SAS system with OOB, with the original diplex frequency response of FIG. 2 overlaid. As can be seen, the OOB signaling adds a lower frequency component to the SAS system. In section 6.6.2 of the SAS specification, it can be seen that the OOB signals COMWAKE, COMINIT/COMRESET, and COMSAS vary in burst/idle frequency between about 1-5 MHz, much lower than the SAS I/O signaling rate. The original diplex circuit, designed for higher voltage continuously switching systems such as Fibre Channel that have no idle time, now has a substantially overlapping frequency response with the burst mode OOB portion of the SAS system. This may manifest as a shift in the OOB signal level that could cause the squelch circuit in the SAS receiver to detect a transition and thus falsely indicate a mode change.

In accordance with the invention, new diplex logic is provided in order that diplex can operate in a SAS system without interference with the OOB signaling. This is done essentially by doubling the speed of the diplex signal, running the diplex signal at a lower peak voltage, and lowering the RC time constants of the diplex filters. The diplex logic of the invention allows the transmitted diplex signal to appear to the OOB receive detection circuitry as noise, while allowing the diplex receive detection logic of the invention to fully recover the diplex signal.

Figure 4:
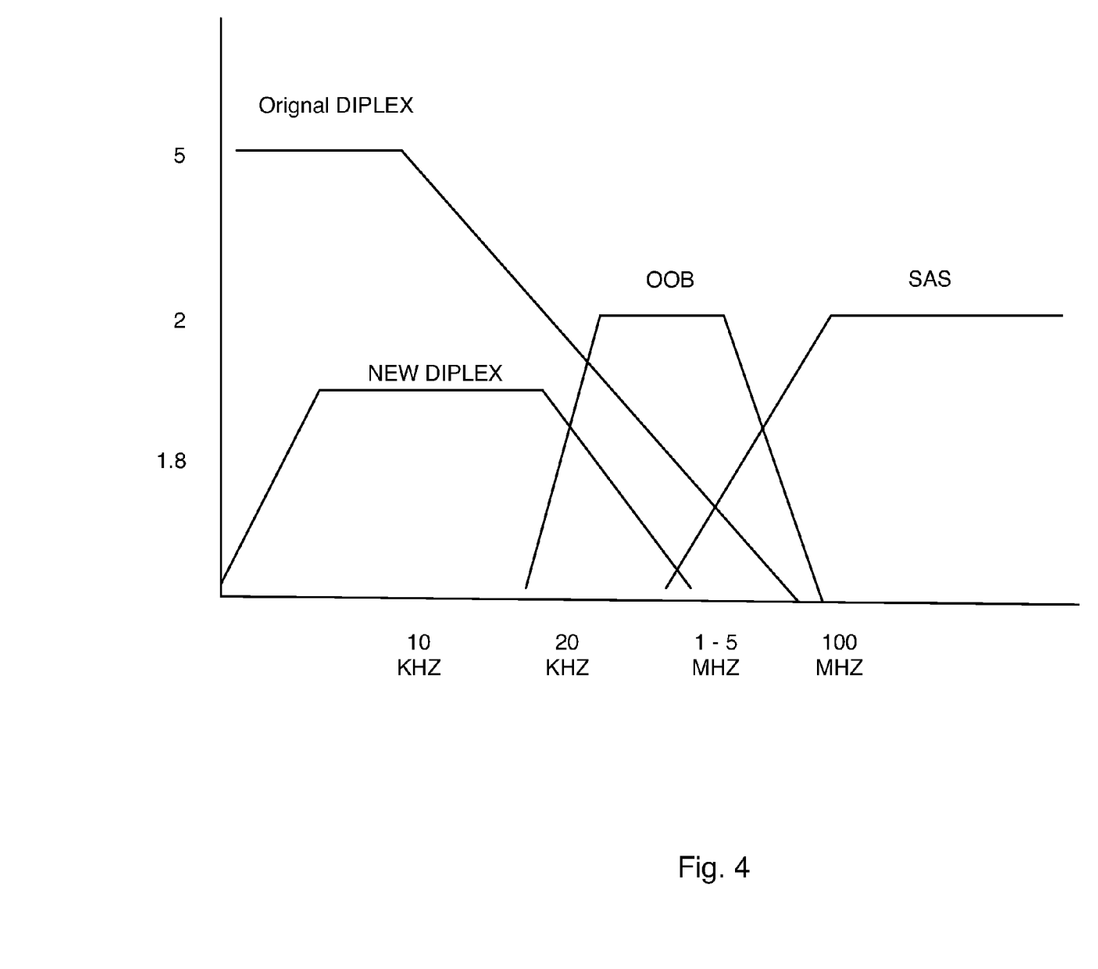
FIG. 4 is a frequency response approximation of the diplex logic of the invention plotted against current SAS and OOB signals.
Figure 5:
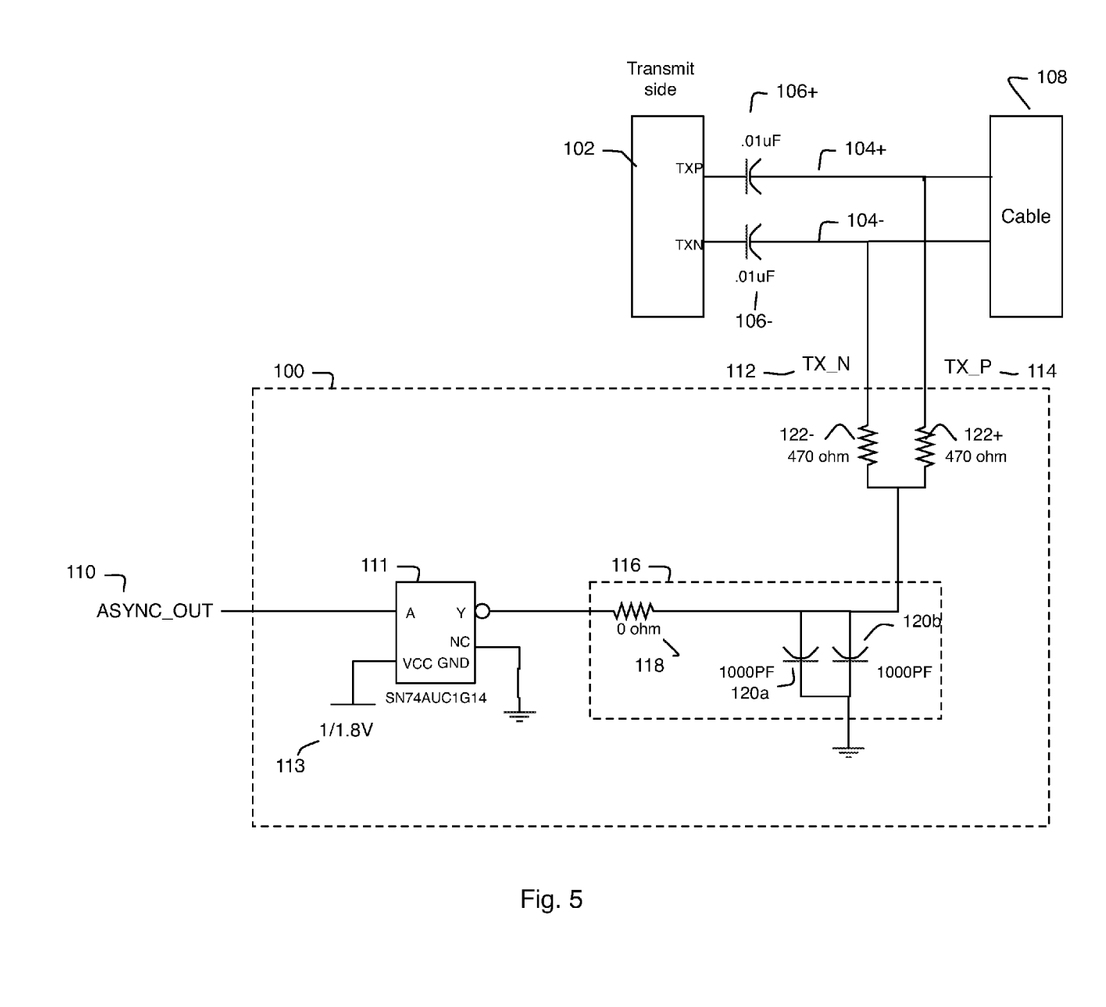
FIG. 5 is a schematic diagram of diplex transmit logic of the invention.
Figure 6:
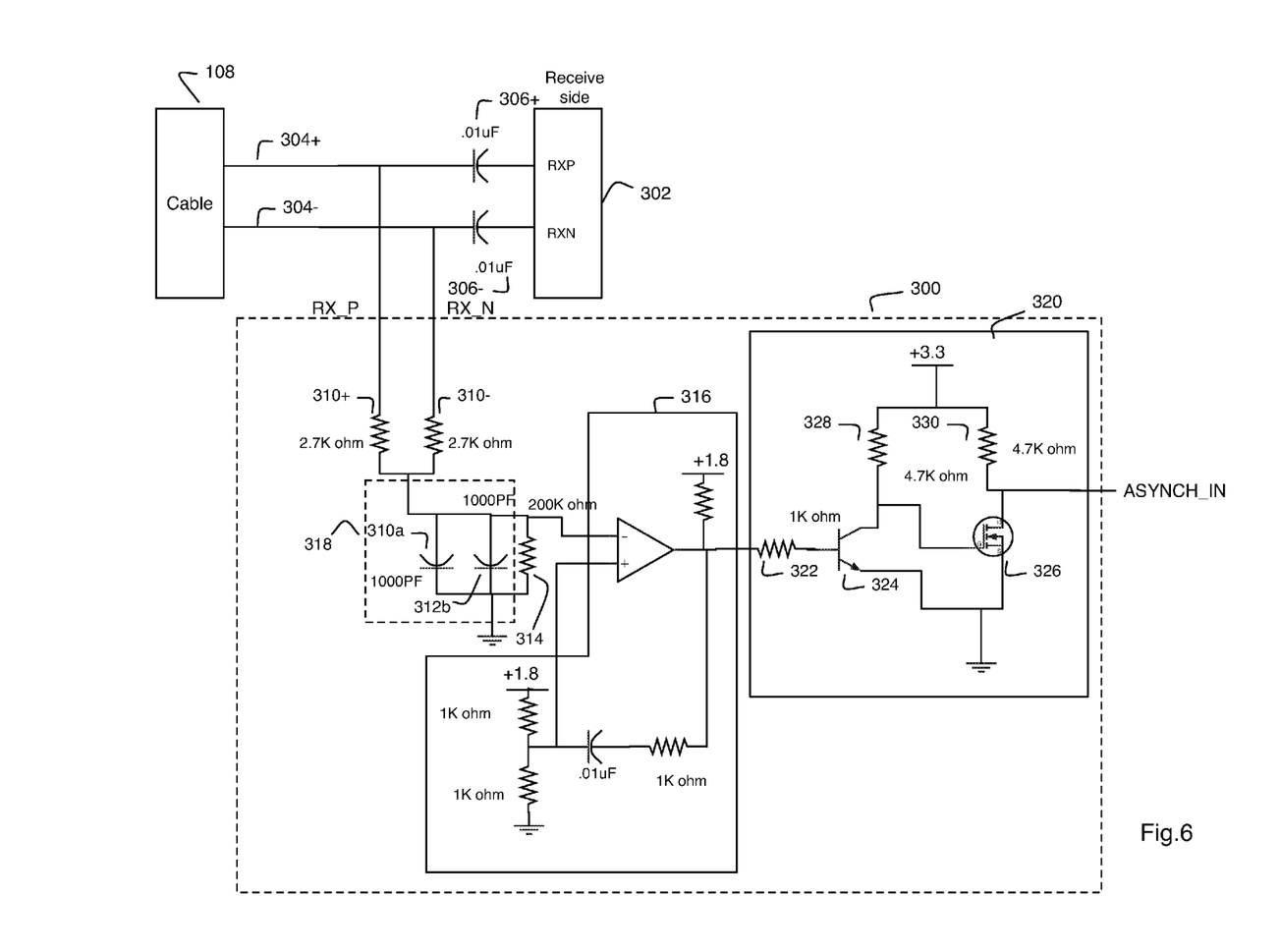
FIG. 6 is a schematic diagram of diplex receive logic of the invention.

In FIG. 4, there is shown an approximate bandwidth profile of the new SAS diplex circuitry overlaid on the SAS and OOB bandwidth profiles, and as compared to the old diplex bandwidth profile. The new diplex logic is twice the speed (19.2K baud) of the old diplex logic (9600 baud), and its peak voltage (approximately 1.8V) is lower than that of the old diplex logic (5V) and that of the SAS and OOB signals (in this embodiment, approximately 2V). The SAS diplex logic of the invention is shown in FIGS. 5-6. FIG. 5 is an embodiment of diplex transmission logic that may be utilized in diplex logic such as 24, 26 of FIG. 1. FIG. 6 is an embodiment of diplex receive logic that may be utilized in diplex logic such as 24, 26 of FIG. 1.

An embodiment of the new diplex common mode transmission logic 100 is shown in FIG. 5. The SAS transmit side 102 includes the SAS differential coupling that differentially couples the SAS and OOB signals onto the differential conductors 104+,− through DC decoupling caps 106+,−. The conductors 104 are coupled to the receive side (FIG. 7) through cable 108). The diplex transmission logic 100 accepts as input an asynchronous signal 110 ASYNC_OUT from the environmental monitor 22. The diplex transmission logic 100 produces as output the transmission signals TX_N (X) 112 AND TX_P(X) 114, which are coupled to the SAS differential transmission signal lines 104−, 104+. In this embodiment, the ASYNCH_OUT signal is input to an inverter with hysteresis 111; for example, a SN74AUC1G14 available from Texas Instruments. This inverter 111 can operate at a VCC of 1-1.8V (113). The output of the inverter 111 is coupled to an RC filter 116. The RC filter 116 of this circuit for each transmission line 104 consists of 0 ohms (functionally depicted by resistor 118) coupled to a 1000 pf capacitor 120a, 120b, and output driver resistance 122+, 122− is 470 ohms, thus diplex signal rise/fall times are faster for the 19.2 k diplex signal. The new Diplex low pass receive logic 300 is shown in FIG. 6. The SAS receive side 302 includes the SAS differential high pass filter receivers that differentially couple the SAS and OOB signals from the differential conductors 304+,− through DC decoupling caps 306+,−. The conductors 304 are coupled to the receive side (FIG. 5) through cable 108. The diplex low pass receive circuit 300 receives as input the differential receive signals RX_P and RX_N from the differential conductors 304, and produces as output the signal ASYNCH_IN to be sent to the environmental monitor 22. The diplex receive logic includes input resistors 310+, 310−, parallel capacitors 312a,b, logic pulldown 314, receive logic 316, and receive output stage 320. The input resistors 310+,− are 2.7K ohms, and the parallel capacitors 312a,b are 1000 pf. The logic pulldown 314 is 200K ohms. The receive logic 316 is powered at 1/1.8V. The increased RC time constant of the low pass filter 318 and lower voltage receive logic 316 enable recovery of the faster, lower voltage diplex signal.)

Also newly included is output stage 320, consisting of 1K ohm series resistor 322 driving network including transistor 324, small signal mosfet 326, both pulled up via 4.7K ohm resistors 328, 330 to 3.3V, in order to widen the received signal level for compatibility with the environmental monitor circuitry to which it is coupled.

In accordance with another aspect of the invention, fault tolerant diplex signaling is provided. Unlike Fibre Channel, the SAS protocol provides four sets of SAS differential signal lines; three for optional use. In accordance with the invention, one set of SAS signals is normally used for diplex communications. In response to a trigger, the diplex communications can be switched to another of the four sets of SAS signals.

Figure 7:
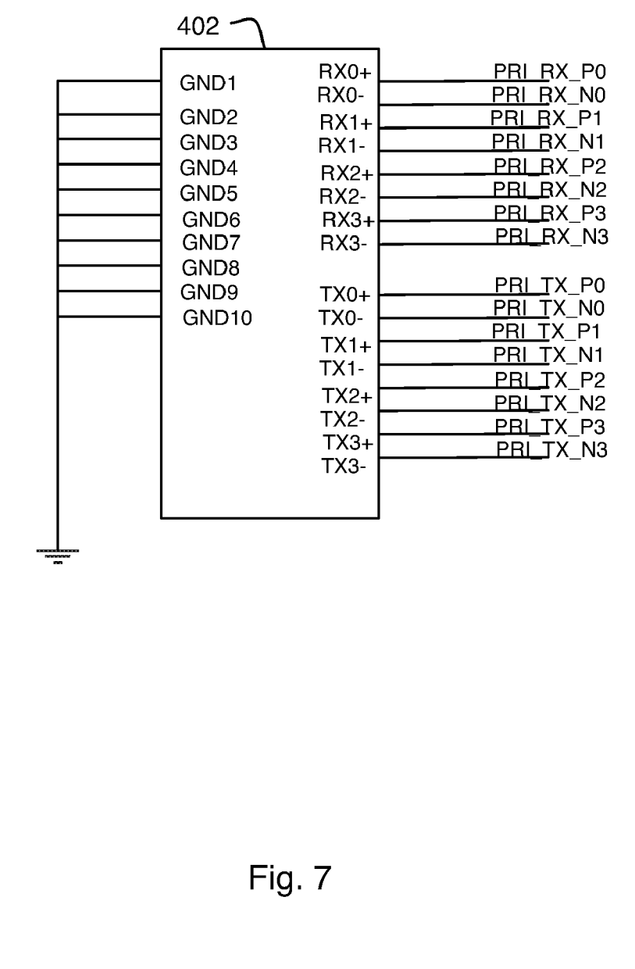
FIG. 7 is a schematic diagram of a connector showing four channels of SAS signals.

Referring to FIG. 7, there is shown an example of a primary port connector 402 as might be coupled to the primary port 16 of FIG. 1. There are four sets of primary differential SAS signals coupled to the connector 402. The primary differential SAS signals are labeled PRI_RX_P0, PRI_RX_N0 . . . PRI_TX_P3, PRI_TX_N3.

Figure 8:
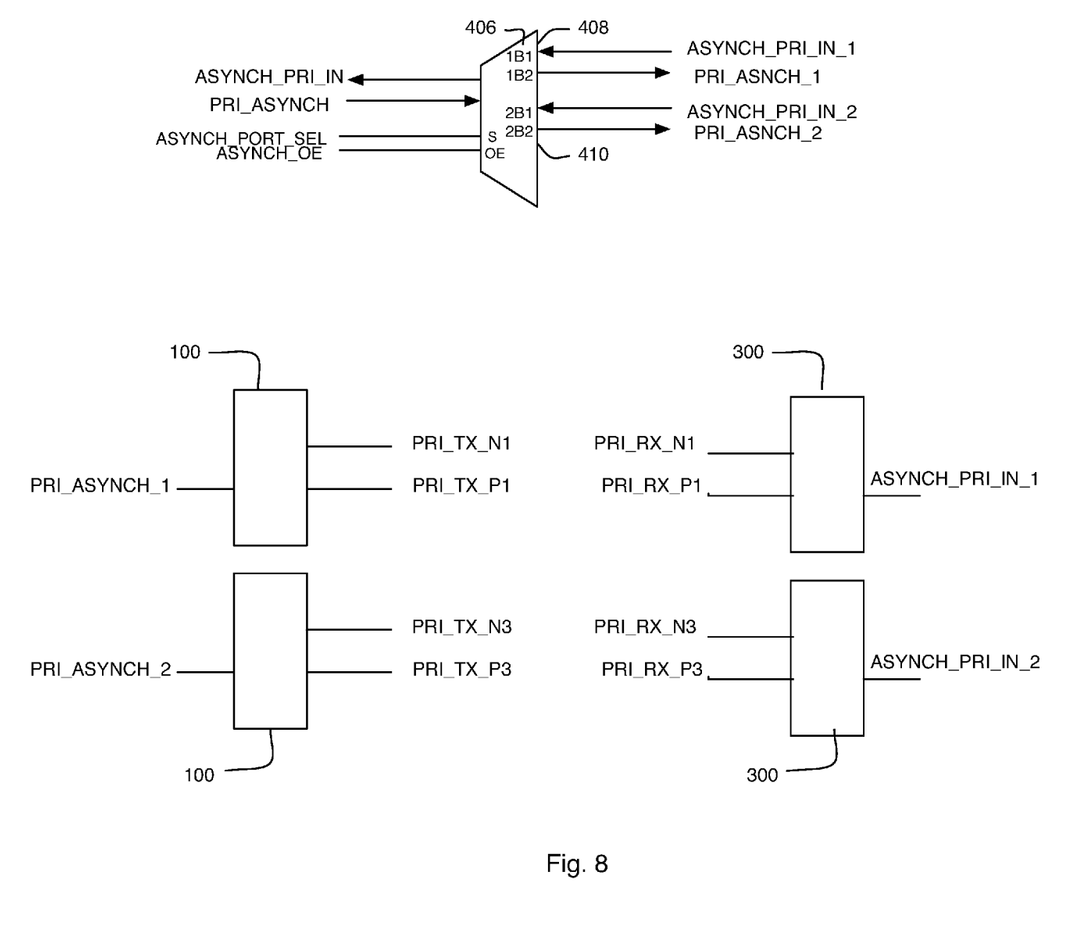
FIG. 8 is a schematic diagram of logic for switching diplexed signals between different SAS signal pairs in accordance with the invention.

In FIG. 8, there is shown a switch or multiplexer 406. The multiplexer 406 receives as input the signals ASYNCH_PRI_IN and PRI_ASYNCH. These two signals may be coupled, for example, between the environmental monitor 22 and the primary port diplexer 24 of FIG. 1. ASYNCH_PRI_IN is input to the environmental monitor circuitry 22. PRI_ASYNCH is output from the environmental monitor circuitry 22. Also input to the multiplexer 406 are signals ASYNCH_OE and ASYNCH_PORT_SEL, also preferably driven by the environmental monitor but possibly by other logic. ASYNCH_OE enables the multiplexer outputs. ASYNCH_PORT_SEL is used to select between the pairs of outputs 1B (408) and 2B (410), as will be further described. ASYNCH_PORT_SEL is normally driven such that the 1B outputs 408 are selected.

The multiplexer 406 drives as output one or the other of two pairs of signals 408 or 410. On its 1B outputs 408, the signals ASYNCH_PRI_IN_1 and PRI_ASYNCH_1 are driven if the signal ASYNCH_PORT_SEL is in its default state. On its 2B outputs, the signals ASYNCH_PRI_IN_2 and PRI_ASYNCH_2 are driven if the signal ASYNCH_PORT_SEL has been triggered to its opposite state.

The signal PRI_ASYNCH_1 is shown as input to diplex low pass transmission logic 100 2 (FIG. 5) coupled to SAS primary differential pair PRI_TX_N1,PRI_TX_P1. SAS primary differential pair PRI_RX_N1, PRI_RX_P1 are in turn coupled through diplex low pass receive logic 300 (FIG. 6) to signal ASYNCH_PRI_IN_1. When the signal ASYNCH_PORT_SEL is in its default state, the signal PRI_ASYNCH will drive the signal PRI_ASYNCH_1 though the transmission logic 100 onto the SAS pair PRI_TX_N1, PRI_TX_P1 (SAS transmit pair 1). Likewise, the receive logic 300 will drive the SAS pair PRI_RX_N1, PRI_RX_P1 (SAS receive pair 1) through the receive logic 300 to produce the signal ASYNCH_PRI_IN_1, which will be passed through the multiplexer 406 onto the PRI_ASYNCH signal to the environmental monitor 22.

At some time, a trigger event may occur to cause the environmental monitor 22 to switch the ASYNCH_PORT_SEL signal to switch to its opposite state. Such trigger events may include but not be limited to: a fault on the SAS differential pair currently in use for diplex, a fault in the diplex circuitry currently in use, an intentional hardware or software switchover, too many retries on diplex protocols, hardware or software timeouts, errors, or a hardware or software upgrade. In this case, the PRI_ASYCH signal is switched onto the PRI_ASYNCH_2 signal, and the ASYNCH_PRI_IN_2 signal is switched to the ASYNCH_PRI_IN signal.

The signal PRI_ASYNCH_2 is shown as input to transmission logic 100 (FIG. 5) coupled to SAS primary differential pair PRI_TX_N3,PRI_TX_P3 (SAS transmit pair 3). SAS primary differential pair PRI_RX_N3, PRI_RX_P3 (SAS receive pair 3) are in turn coupled through receive logic 300 (FIG. 6) to signal ASYNCH_PRI_IN_2. Now that the signal ASYNCH_PORT_SEL is in its non-default state, the RS-232 signal PRI_ASYNCH will drive the signal PRI_ASYNCH_2 though the transmission logic 100 or 200 onto the SAS pair PRI_RX_N3, PRI_RX_P3. Likewise, the receive logic 300 will drive the SAS pair PRI_RX_N3, PRI_RX_P3 through the receive logic 300 to produce the signal ASYNCH_PRI_IN_2, which will be passed through the multiplexer 406 onto the PRI_ASYNCH signal to the RS-232 logic. Now the diplex signals are driven on SAS differential pair 3 rather than SAS differential pair 1. The diplex signals can be left on pair 3 after the switch, or can be switched back to pair 1 after the trigger event has been dealt with.

Figure 9:
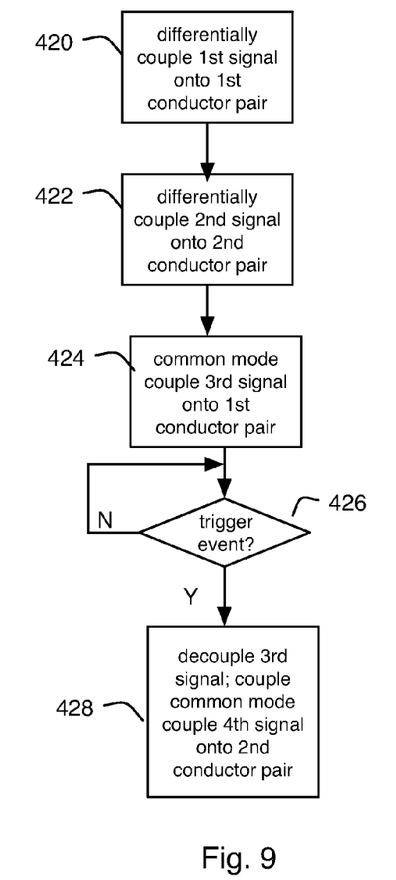
FIG. 9 is a flow diagram for switching diplexed signals between different SAS signal pairs in accordance with the invention.

In FIG. 9 there is shown the process by which the diplex signal is switched between conductor pairs. A first differential signal, such as a SAS signal, is coupled to a first conductor pair at step 420. A second differential signal, such as another SAS signal, is coupled to a second conductor pair at step 422. A third common mode signal, e.g. a diplex signal, is coupled onto the first conductor pair at step 424. If a trigger event occurs as described above (step 426), then the third common mode signal is decoupled and a fourth common mode signal, e.g. a diplex signal, is coupled onto the second conductor pair (step 428).

SAS pairs 1 and 3 have been chosen by example herein for carrying the switched diplex signal. But different designs could choose different differential pairs on which to implement the invention for different purposes. Furthermore, the example of FIGS. 7 and 8 was shown with regard to the primary port with the understanding that the same logic can be implemented for the diplex and SAS signals of the expansion port.

The present invention is not to be limited in scope by the specific embodiments described herein. Though the invention has been described with regard to SAS and RS-22, it will apply to other high speed I/O communications protocols with burst modes, and it will apply to other low speed communications buses such as I2C. Likewise, The ability to switch a diplexed low speed signal between different high speed I/O links is not limited to SAS, but can be implemented in any system where multiple high speed I/O links are available. Indeed, various modifications of the present invention, in addition to those described herein, will be apparent to those of ordinary skill in the art from the foregoing description and accompanying drawings. Thus, such modifications are intended to fall within the scope of the invention. Furthermore, many functions described herein may be implemented in hardware or in software. Further, although aspects of the present invention have been described herein in the context of a particular implementation in a particular environment for a particular purpose, those of ordinary skill in the art will recognize that its usefulness is not limited thereto and that the present invention can be beneficially implemented in any number of environments for any number of purposes.

I claim:

1. Apparatus comprising:
    a first differential coupling which differentially couples a first signal onto a first pair of conductors;
    a second differential coupling which differentially couples a second signal onto a second pair of conductors;
    a first common mode coupling which can be selected to common mode couple a third signal onto the first pair of conductors;
    a second common mode coupling which can be selected to common mode couple a fourth signal onto the second pair of conductors;
    a switch operational to select the first common mode coupling or the second common mode coupling based upon a triggering event so that a communications protocol is carried on the third signal if the first common mode coupling is selected, or on the fourth signal if the second common mode coupling is selected, said communications protocol being different than the protocols carried on the first and second signals.

2. The apparatus of claim 1 wherein the triggering event is a fault or a manual or automatic switchover or an upgrade.

3. The apparatus of claim 2 wherein the first and second signals each comprise a continuous signal having a continuous rate and a burst mode signal having bursts occurring at one or more frequencies.

4. The apparatus of claim 3 further comprising:
    a first high pass filter coupled to the first pair of conductors for extracting the continuous signal and the burst mode signal from the first pair of conductors;

a first low pass filter coupled to the first pair of conductors for extracting the second signal from the first pair of conductors;

a second high pass filter coupled to the second pair of conductors for extracting the continuous signal and the burst mode signal from the second pair of conductors;

a second low pass filter coupled to the second pair of conductors for extracting the second signal from the second pair of conductors.

5. The apparatus of claim 4 wherein the first and second signals each comprise a SAS 8B/10B encoded signal and a SAS OOB signal, and wherein the third and fourth signals comprise RS-232 signals.

6. A method comprising the steps of:
differentially coupling a first signal onto a first pair of conductors;
differentially coupling a second signal onto a second pair of conductors;
common mode coupling a third signal onto the first pair of conductors via a switch;
common mode coupling a fourth signal onto the second pair of conductors via the switch;
operating the switch to select the first common mode coupling or the second common mode coupling based upon a triggering event so that a communications protocol is carried on the third signal if the first common mode coupling is selected, or on the fourth signal if the second common mode coupling is selected, said communications protocol being different than the protocols carried on the first and second signals.

7. The method of claim 6 wherein the triggering event is a fault or a manual or automatic switchover or an upgrade.

8. The method of claim 7 wherein the first and second signals each comprise a continuous signal having a continuous rate and a burst mode signal having bursts occurring at one or more frequencies.

9. The method of claim 7 further comprising the steps of:
coupling a first high pass filter to the first pair of conductors for extracting the continuous signal and the burst mode signal from the first pair of conductors;
coupling a first low pass filter to the first pair of conductors for extracting the second signal from the first pair of conductors;
coupling a second high pass filter to the second pair of conductors for extracting the continuous signal and the burst mode signal from the second pair of conductors;
coupling a second low pass filter to the second pair of conductors for extracting the second signal from the second pair of conductors.

10. The method of claim 9 wherein the first and second signals each comprise a SAS 8B/10B encoded signal and a SAS OOB signal, and wherein the third and fourth signals comprise RS-232 signals.

* * * * *